United States Patent
Ham et al.

(10) Patent No.: US 10,006,421 B2
(45) Date of Patent: Jun. 26, 2018

(54) FUEL FILTER FOR DIESEL ENGINE

(71) Applicants: Hyundai Motor Company, Seoul (KR); Mann+Hummel GmbH, Ludwigsburg (DE)

(72) Inventors: Chang Ho Ham, Ansan-si (KR); Dong Myoung Ryoo, Yongin-si (KR); Jae Hyub Hyun, Wonju-si (KR); Seung Chun Choi, Wonju-si (KR); Han Poong Lee, Wonju-si (KR)

(73) Assignees: Hyundai Motor Company, Seoul (KR); Mann+Hummel GmbH, Ludwigsburg (DE)

( * ) Notice: Subject to any disclaimer, the term of this patent is extended or adjusted under 35 U.S.C. 154(b) by 56 days.

(21) Appl. No.: 14/839,104

(22) Filed: Aug. 28, 2015

(65) Prior Publication Data

US 2016/0138538 A1  May 19, 2016

(30) Foreign Application Priority Data

Nov. 14, 2014 (KR) .................. 10-2014-0158782

(51) Int. Cl.

| | |
|---|---|
| *B01D 35/18* | (2006.01) |
| *F02M 37/22* | (2006.01) |
| *B01D 35/00* | (2006.01) |
| *B01D 35/30* | (2006.01) |
| *B01D 36/00* | (2006.01) |

(52) U.S. Cl.
CPC ......... *F02M 37/221* (2013.01); *B01D 35/005* (2013.01); *B01D 35/18* (2013.01); *B01D 35/30* (2013.01); *B01D 36/005* (2013.01); *B01D 36/006* (2013.01); *F02M 37/223* (2013.01); *B01D 2201/295* (2013.01); *B01D 2201/303* (2013.01)

(58) Field of Classification Search
CPC .................................................... F02M 37/221
See application file for complete search history.

(56) References Cited

U.S. PATENT DOCUMENTS

| | | | | |
|---|---|---|---|---|
| 5,259,953 | A * | 11/1993 | Baracchi | B01D 35/30 |
| | | | | 210/232 |
| 2010/0258491 | A1* | 10/2010 | Jokschas | B01D 27/08 |
| | | | | 210/181 |
| 2013/0292324 | A1* | 11/2013 | Girondi | B01D 29/055 |
| | | | | 210/450 |

FOREIGN PATENT DOCUMENTS

| | | |
|---|---|---|
| DE | 10 2008 043 197 A1 | 4/2010 |
| EP | 2 239 034 A2 | 10/2010 |
| JP | 2004-518840 A | 6/2004 |
| KR | 2002-0038315 A | 5/2002 |
| KR | 10-2009-0064100 A | 6/2009 |

(Continued)

*Primary Examiner* — Peter Keyworth
(74) *Attorney, Agent, or Firm* — Morgan, Lewis & Bockius LLP

(57) ABSTRACT

A fuel filter for a diesel engine may include an upper cover forming inflow and outflow passages of diesel fuel, a housing integrally mounted in a vehicle body, coupled to the upper cover and housing a filter assembly, and a body penetrating a central portion of the filter assembly, disposed between the upper cover and the filter assembly and integrally forming the upper cover, a heater assembly, and a moisture sensor, in which the heater assembly may be configured to selectively operate according to a detection signal of a fuel temperature sensor that is provided in the engine body.

11 Claims, 9 Drawing Sheets

(56) References Cited

FOREIGN PATENT DOCUMENTS

| KR | 10-2010-0050267 A | 5/2010 |
|---|---|---|
| WO | WO 2012/104699 A1 | 8/2012 |

\* cited by examiner

FUEL FILTER FOR DIESEL ENGINE

CROSS-REFERENCE TO RELATED APPLICATION

The present application claims priority to Korean Patent Application No. 10-2014-0158782 filed Nov. 14, 2014, the entire contents of which is incorporated herein for all purposes by this reference.

BACKGROUND OF THE INVENTION

Field of the Invention

The present invention relates to a fuel supply system of a diesel engine. More particularly, the present invention relates to a fuel filter for a diesel engine for filtering diesel fuel that is supplied from a fuel tank to a diesel engine.

Description of Related Art

In general, a diesel fuel filter is formed in a diesel fuel supply system for supplying diesel fuel that is stored at a fuel tank to a diesel engine.

The diesel fuel filter filters diesel fuel that is supplied from the fuel tank to the diesel engine, filters impurities that are included in the diesel fuel, heats the diesel fuel so it does not coagulate, and separates moisture that is contained in the diesel fuel to discharge the moisture to the outside.

Such a diesel fuel filter basically includes a housing, a filter that is housed in the housing, a head cover that is coupled to an upper portion of the housing, and a heater that is installed between the filter and the head cover.

Further, the diesel fuel filter includes a thermo switch that is installed at the head cover side and that applies a switching signal to a heater according to a temperature of diesel fuel, a moisture sensor that detects a water level of moisture and that is stored at a housing, and a drain plug that is installed in a lower portion of the housing and that discharges moisture within the housing.

The diesel fuel filter is generally mounted in a vehicle body through a mounting unit, for example, in the diesel fuel filter, the head cover side is located at the upper side of a cowl panel, and the housing side is located at a brake booster side.

However, a conventional diesel fuel filter having the foregoing configuration includes an outer nipple, a thermo switch, a sensor circuit, and a connector that are mounted in a vehicle body and that are protruded to the outside of a housing in a head cover, and thus structural robustness thereof is weak, and when a vehicle offset-collides, the diesel fuel filter may be damaged by the collision force.

Further, since the conventional diesel fuel filter includes an outer nipple, a thermo switch, a sensor circuit, and a connector that are protruded to the outside of a housing at a head cover, there is a drawback that it is difficult to set a layout in a design step, and the conventional diesel fuel filter has disadvantageous in assembly workability and maintainability because of peripheral components.

In order to operate a heater, because a conventional diesel fuel filter should have a thermo switch that applies a switching signal to the heater according to a temperature of diesel fuel, an entire structure of the diesel fuel filter is complicated and the number of assembly components increases, and thus an assembly failure may occur and production cost and weight may increase.

Further, because the conventional diesel fuel filter adapts a method of exchanging a cartridge including a filter and a housing as regular exchange components, environment pollution may occur due to disposal of the cartridge.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a fuel filter for a diesel engine having advantages of being capable of enhancing robustness and collision stability when a vehicle collides, easily setting a layout, enhancing assembly workability and maintainability, and minimizing environmental pollution, and a fuel filter for a diesel engine having advantages of being capable of removing a thermo switch by controlling operation of a heater using a fuel temperature sensor of the engine side.

According to various aspects of the present invention, a fuel filter for a diesel engine may include an upper cover forming inflow and outflow passages of diesel fuel, a housing integrally mounted in a vehicle body, coupled to the upper cover and housing a filter assembly, and a body penetrating a central portion of the filter assembly, disposed between the upper cover and the filter assembly and integrally forming the upper cover, a heater assembly, and a moisture sensor, in which the heater assembly may be configured to selectively operate according to a detection signal of a fuel temperature sensor that is provided in the engine body.

The fuel filter may further include a reinforcing plate bonded to a lower surface of the upper cover and reinforcing rigidity of the upper cover.

The body may form a moisture drain passage that is connected to an inner lower portion of the housing in a portion that penetrates the central portion of the filter assembly.

The moisture sensor may include a pair of moisture detection pins installed in the moisture drain passage.

A moisture exhaust nipple penetrating the upper cover and connected to the moisture drain passage may be installed in an upper end portion of the body, and a moisture drain plug may be installed in the moisture exhaust nipple.

The housing may be fixedly installed in the vehicle body through a mounting bracket, and the housing and the mounting bracket may be indentation-engaged through a pressing pin.

According to various aspects of the present invention a fuel filter for a diesel engine may include an upper cover forming inflow and outflow passages of diesel fuel, a housing integrally mounted in a vehicle body through a mounting bracket, coupled to the upper cover, and housing a filter assembly, a body forming a moisture drain passage that penetrates a central portion of the filter assembly, disposed between the upper cover and the filter assembly, and connected to an inner lower portion of the housing, a heater assembly installed at an inside of an upper end portion of the body, a moisture sensor installed in a moisture drain passage of the body and configured to detect a water level of moisture that is separated from diesel fuel, and a moisture exhaust portion that may be provided in an upper end portion of the body in order to discharge moisture that is injected into the moisture drain passage and that penetrates the upper cover.

The body may have a single module form and may integrally form the upper cover, the heater assembly, the moisture sensor, and the moisture exhaust portion.

The body may include a head portion located between the upper cover and the filter assembly and fixed to an inner wall surface of the housing, and a stem portion integrally connected to the head portion, penetrating a central portion of the filter assembly, and forming the moisture drain passage.

The heater assembly may include a pair of heat releasing plates installed at a predetermined gap from a lower surface of the head portion, and a plurality of Positive Temperature Coefficient (PTC) heaters fixedly installed between the pair of heat releasing plates.

A predetermined heating space may be formed between a lower surface of the head portion and the heat releasing plate, and the heating space may be connected to a space between an inner wall surface of the housing and the filter assembly through at least one penetration hole provided in the heat releasing plate.

The installed in the upper cover may be a fuel inflow nipple connected to the heating space and configured to inject diesel fuel into the filter assembly, and a fuel exhaust nipple configured to discharge diesel fuel from which moisture and a foreign substance are removed while passing through the filter assembly.

A reinforcing plate that reinforces rigidity of the upper cover may be bonded to a lower surface of the upper cover, and a fuel exhaust nipple for discharging the diesel fuel from which moisture and a foreign substance are removed while passing through the filter assembly may be installed in the upper cover.

The reinforcing plate may be coupled to an upper surface of the head portion, an exhaust flow channel for discharging the diesel fuel from which moisture and the foreign substance are removed while passing through the filter assembly may be formed in the stem portion, and a connection flow channel that connects the exhaust flow channel and the fuel exhaust nipple may be formed between the reinforcing plate and the lower surface of the upper cover in the reinforcing plate.

The reinforcing plate may include a penetrating portion protruded from a center thereof in a downward direction, coupled to the upper surface of the head portion, and connected to the exhaust flow channel of the stem portion.

The reinforcing plate may form a groove of a predetermined area that is inwardly recessed in a downward direction and that is connected to the penetrating portion, and the groove may be formed as a connection flow channel that connects the exhaust flow channel and the fuel exhaust nipple between the upper cover and the reinforcing plate.

The moisture sensor may include a pair of moisture detection pins that are insert-injected to the stem portion and that are disposed at the moisture drain passage.

A moisture detection circuit that is electrically connected to the moisture detection pin may be installed at an upper surface of the upper cover.

The moisture exhaust portion may include a moisture exhaust nipple that penetrates the upper cover and that is connected to a moisture drain passage of the stem portion, and a moisture drain plug installed in the moisture exhaust nipple.

The drain plug may include a plug body that is screw-coupled to the moisture exhaust nipple and that selectively opens and closes the moisture drain passage, and a drain hole that forms a screw thread in a portion of an outer circumferential surface of the plug body and that is connected from a remaining outer circumferential surface to an upper surface is formed in the drain plug.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
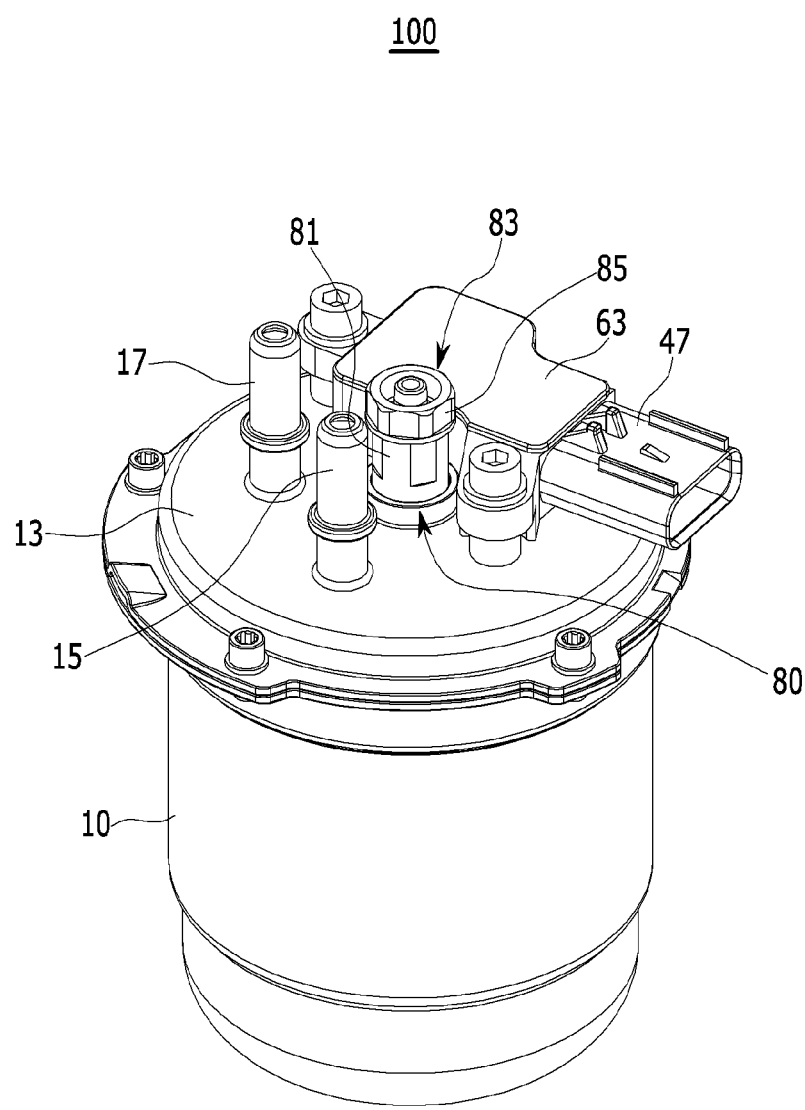
FIG. 1 is a perspective view illustrating an exemplary fuel filter for a diesel engine according to the present invention.

FIG. 1 is a perspective view illustrating a fuel filter for a diesel engine according to various embodiments of the present invention.

Referring to FIG. 1, a diesel engine fuel filter 100 according to various embodiments of the present invention may be applied to a diesel fuel supply system for supplying diesel fuel that is stored at a fuel tank to a diesel engine.

The diesel engine fuel filter 100 according to various embodiments of the present invention filters diesel fuel (hereinafter, for convenience, referred to as or supplying diesel fuel from the fuel tank to a diesel engine.

Such a diesel engine fuel filter 100 filters impurities that are included in the fuel, heats the fuel so that fuel does not coagulate in a winter season, separates moisture that is contained in the fuel, and discharges the moisture to the outside.

The diesel engine fuel filter 100 according to various embodiments of the present invention is formed in a structure that can enhance robustness and collision stability when a vehicle collides, easily set a layout, enhance assembly workability and maintainability, and minimize environmental pollution.

Further, in various embodiments of the present invention, by controlling operation of a heater using a fuel temperature sensor of the engine side, a diesel engine fuel filter 100 that can eliminate an existing thermo switch is provided.

Figure 2:
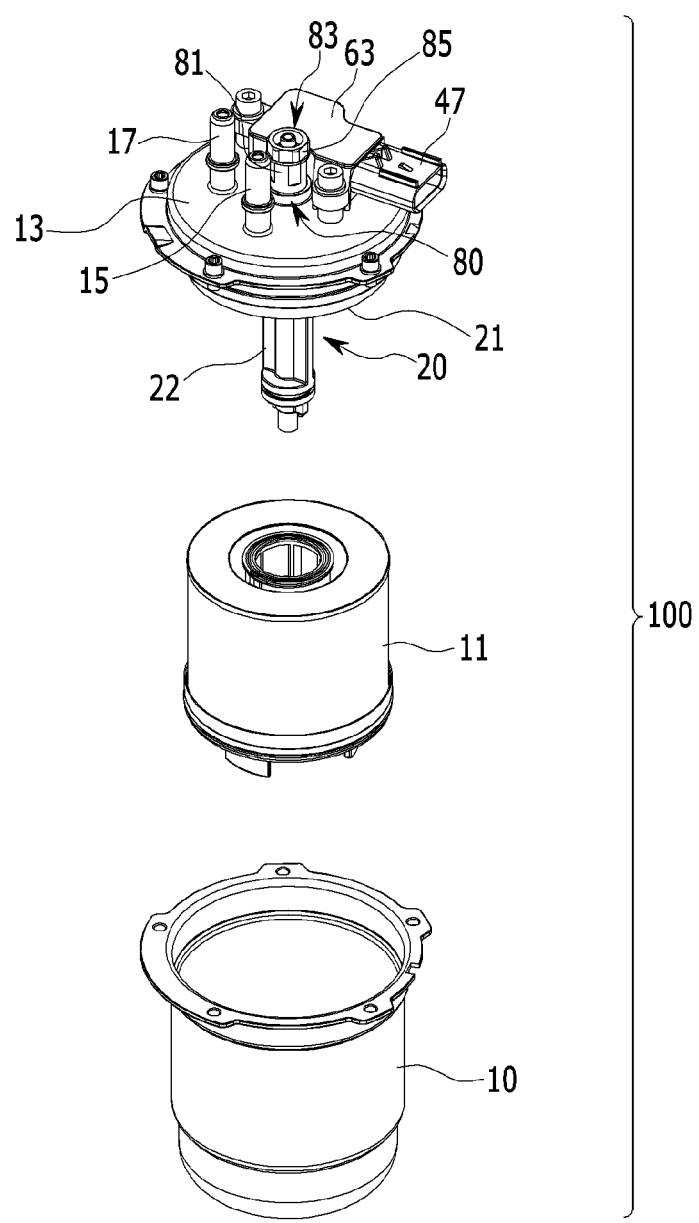
FIG. 2 is an exploded perspective view illustrating the exemplary fuel filter for the diesel engine according to the present invention.
Figure 3:
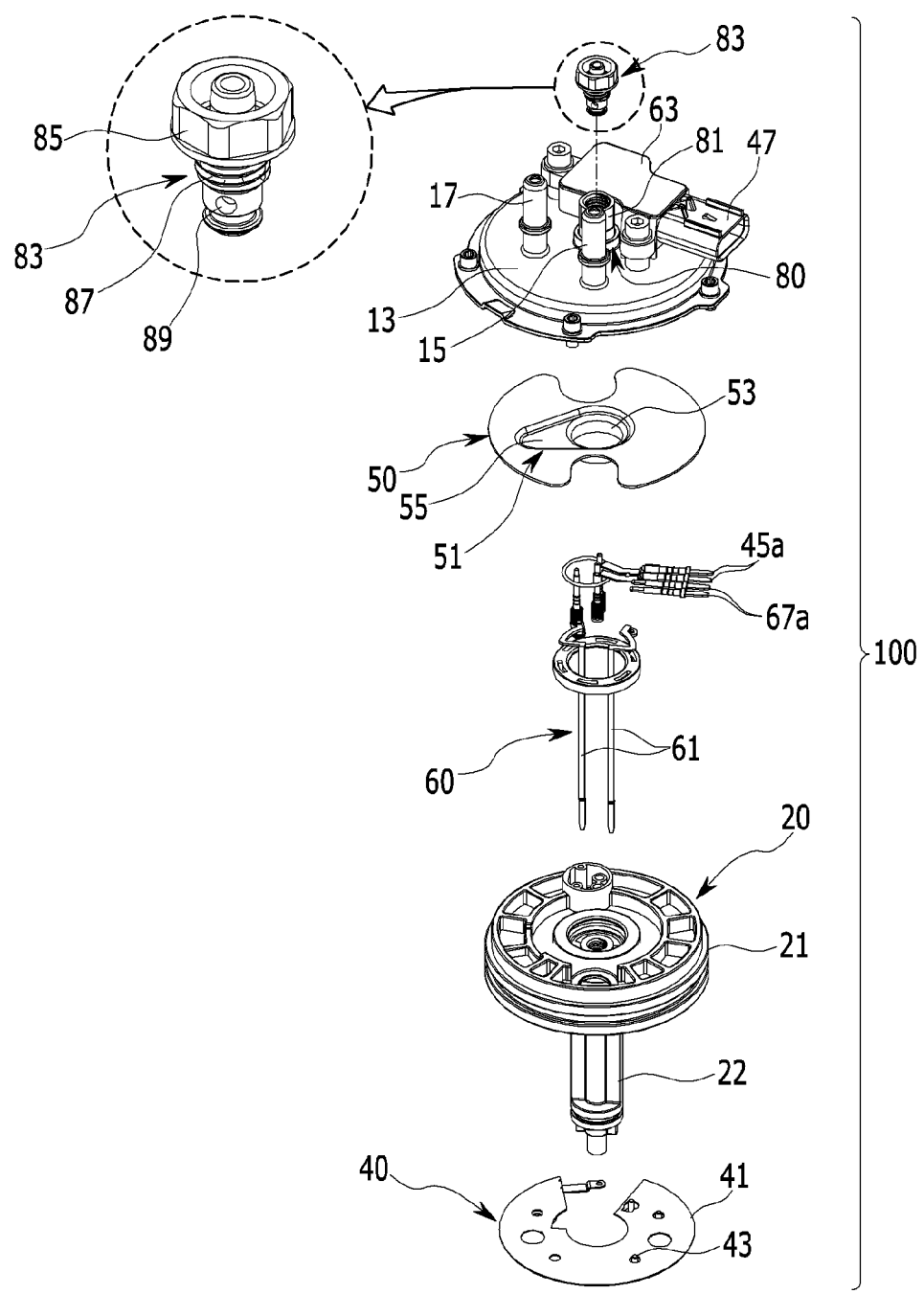
FIG. 3 is an exploded perspective view illustrating a portion of the exemplary fuel filter for the diesel engine according to the present invention.
Figure 4:
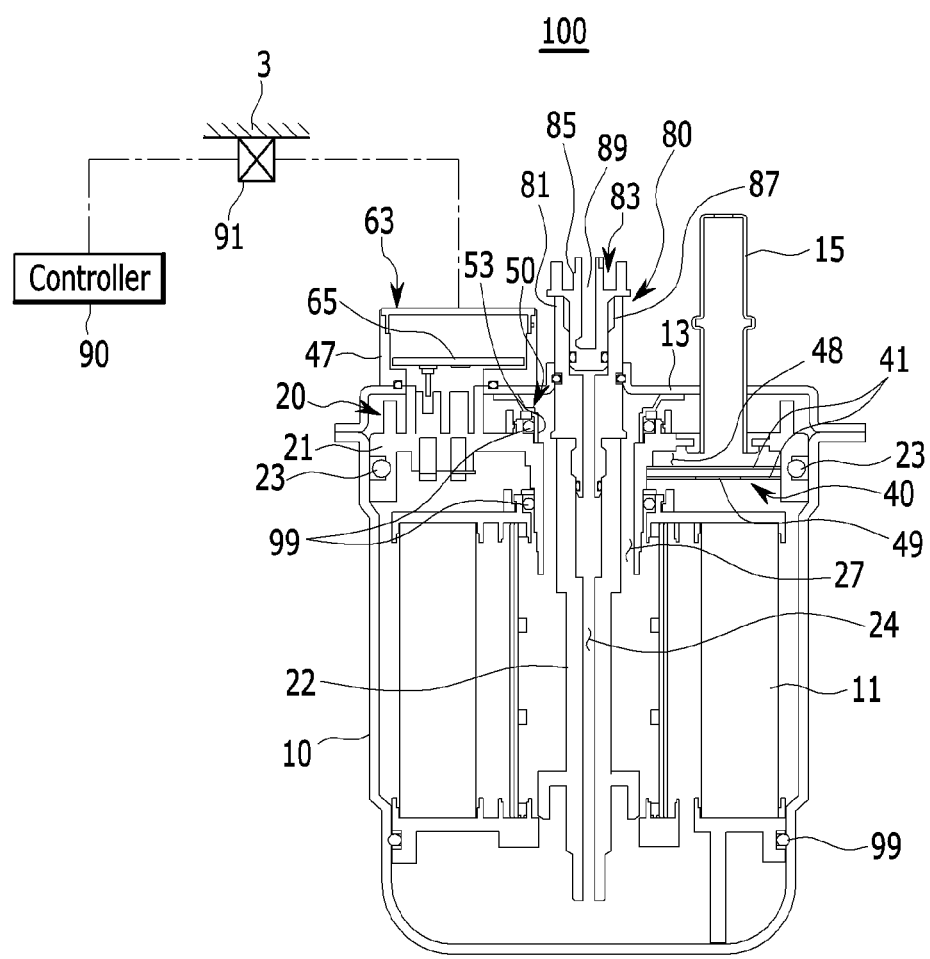
FIG. 4 and FIG. 5 are cross-sectional views illustrating the exemplary fuel filter for the diesel engine according to the present invention.
Figure 5:
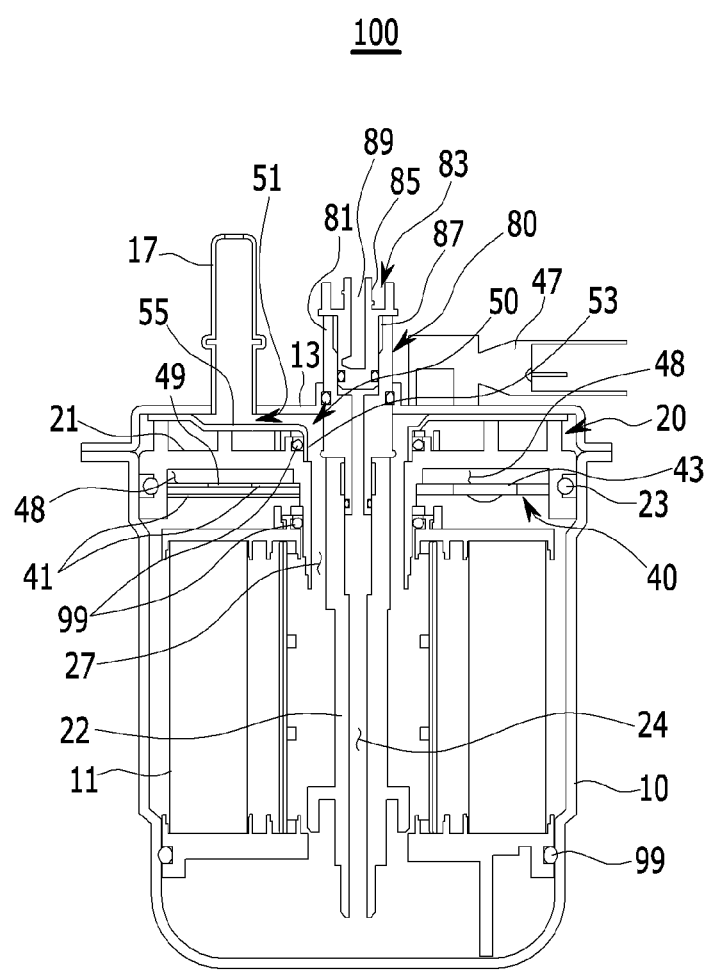

FIG. 2 is an exploded perspective view illustrating a fuel filter for a diesel engine according to various embodiments of the present invention, FIG. 3 is an exploded perspective view illustrating a portion of a fuel filter for a diesel engine according to various embodiments of the present invention, and FIG. 4 and FIG. 5 are cross-sectional views illustrating a fuel filter for a diesel engine according to various embodiments of the present invention.

Referring to FIG. 1 to FIG. 5, the diesel engine fuel filter 100 according to various embodiments of the present invention basically includes a housing 10, a body 20, a heater assembly 40, a moisture sensor 60, and a moisture exhaust portion 80.

In various embodiments of the present invention, the housing 10 is formed in a container form that has an internal space, and of which an upper end portion is opened and a lower end portion is closed. A filter assembly 11 for filtering diesel fuel is mounted at the internal space of the housing 10. The filter assembly 11 has a hollow portion that is connected to the internal space of the housing 10 in a central portion thereof.

Such a filter assembly 11 is formed as a filter element of a diesel fuel filter device of a known technology that is widely known in the art, and thus in this specification, a detailed description of a configuration thereof will be omitted.

In various embodiments of the present invention, an upper cover 13 that covers the upper end portion of the housing 10 is coupled to an upper end portion thereof. The upper cover 13 is formed with a metal plate and is fixedly installed at an upper end edge of the housing 10 through a coupling device such as a bolt.

The upper cover 13 forms inflow and outflow passages of a diesel fuel for filtering diesel fuel through the filter assembly 11. Accordingly, a fuel inflow nipple 15 for injecting diesel fuel into the filter assembly 11 is installed in the upper cover 13, and a fuel exhaust nipple 17 for discharging fuel from which foreign substances and moisture are removed while passing through the filter assembly 11 is installed in the upper cover 13.

The fuel inflow nipple 15 and the fuel exhaust nipple 17 penetrate the upper cover 13 and are fixedly installed in the upper cover 13. A mounting hole for mounting the moisture sensor 60 and the moisture exhaust portion 80 to be described later is formed in the upper cover 13.

The housing 10 may store moisture that is separated from the diesel fuel through the filter assembly 11 at a lower portion of the inside thereof. Such a housing 10 is formed in a structure having a larger thickness t by 0.4 t or more than an existing housing, and is provided as a housing with high rigidity in which an existing protector is eliminated.

Figure 6:
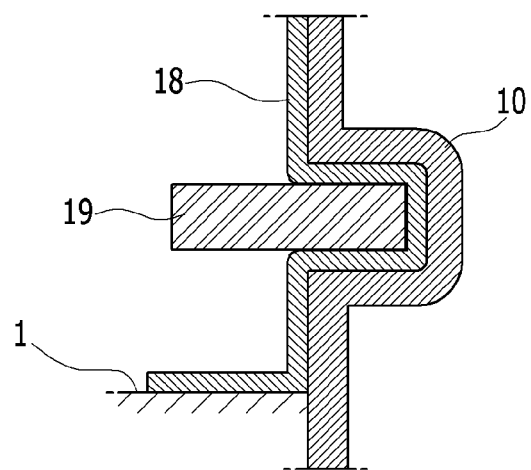
FIG. 6 is a diagram illustrating a vehicle body mounting structure of the exemplary fuel filter for the diesel engine according to the present invention.

Further, as shown in FIG. 6, the housing 10 is integrally mounted in a vehicle body 1. For example, the housing 10 may have an external circumferential surface that is fixedly mounted to the vehicle body 1. The housing 10 may be fixedly installed to the vehicle body 1 through a mounting bracket 18.

Here, the mounting bracket 18 is fixedly installed in the vehicle body 1. The housing 10 and the mounting bracket 18 are indentation-engaged through a pressing pin 19. In various embodiment of the present invention, the mounting bracket 18 closely contacts an external circumferential surface of the housing 10, and in a state in which the pressing pin 19 faces the mounting bracket 18, the housing 10 and the mounting bracket 18 may be indentation-engaged through the pressing pin 19.

That is, in various embodiments of the present invention, in a state of supporting an inside wall of the housing 10, when the pressing pin 19 is pressed in the mounting bracket 18, the mounting bracket 18 may be indentation-engaged with the housing 10 by the pressing pin 19.

Referring to FIG. 1 to FIG. 5, in various embodiments of the present invention, the body 20 mounts the heater assembly 40, the moisture sensor 60, and the moisture exhaust portion 80 to be described later.

The body 20 integrally forms the heater assembly 40, the moisture sensor 60, and the moisture exhaust portion 80 as a single module together with the upper cover 13, penetrates a central portion of the filter assembly 11 at the inside of the housing 10, and is disposed between the upper cover 13 and the filter assembly 11.

The body 20 is separated from diesel fuel through the filter assembly 11, and performs a function of discharging moisture that is stored at a lower portion of the inside of the housing 10 to the outside of the housing 10. The body 20 performs a function of discharging diesel fuel in which moisture and foreign substances are removed to the outside through the fuel exhaust nipple 17 while passing through the filter assembly 11 at the inside of the housing 10.

Such a body 20 includes a head portion 21 that is disposed between the upper cover 13 and the filter assembly 11, and a stem portion 22 that is integrally connected to the head portion 21 and that penetrates a central portion of the filter assembly 11.

The head portion 21 has a circular shape having a predetermined thickness and is fixed to an inner wall surface of the housing 10 through a sealing rubber 23, and the heater assembly 40, the moisture sensor 60, and the moisture exhaust portion 80 to be described later may be mounted in the head portion 21.

The stem portion 22 is connected in a downward direction from a central portion of the head portion 21, and a moisture drain passage 24 as a hollow portion is formed in a length direction in the stem portion 22.

The moisture drain passage 24 connects a lower portion of the inside of the housing 10 and the moisture exhaust portion 80 to be described later, and forms a moisture drain stream. That is, the moisture drain passage 24 performs a function of moving moisture that is stored in a lower portion of the inside of the housing 10 to the moisture exhaust portion 80.

In various embodiments of the present invention, the heater assembly 40 heats fuel that is injected into the filter assembly 11 through the fuel inflow nipple 15 of the upper cover 13 in a low temperature condition such as a winter season, thereby preventing fuel from being coagulated.

Figure 7:
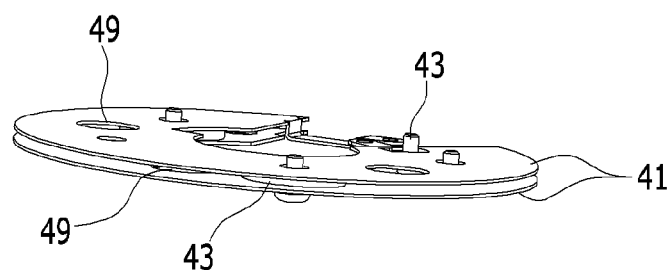
FIG. 7 is a perspective view illustrating a heater assembly that is applied to the exemplary fuel filter for a diesel engine according to the present invention.

Such a heater assembly 40 receives predetermined power to generate heat, and is installed at the lower surface side of the head portion 21 as the inside of an upper end portion of the body 20. As shown in FIG. 7, the heater assembly 40 includes a pair of heat releasing plates 41 and a plurality of Positive Temperature Coefficient (PTC) elements 43.

The heat releasing plate 41 is made of a metal material that can easily discharge heat, is installed at the inside of a lower surface of the head portion 21 in the body 20, and is installed at a predetermined gap from a lower surface of the head portion 21 with an approximately circular form (see FIG. 4 and FIG. 5).

The PTC elements 43 receive power to generate heat. In order to transfer heat to the heat releasing plate 41, the PTC elements 43 are disposed between a pair of heat releasing plates 41 and are fixedly engaged with the heat releasing plate 41 through an engagement bolt.

Such PTC elements 43 are formed with a semiconductor element, and when a current of a predetermined magnitude or more flows, heat is produced in the PTC elements 43. When the PTC elements 43 arrive at a switching temperature by magnetic heat emission, electrical resistance increases, and by blocking a current, the PTC elements 43 perform a function of generating heat of a predetermined temperature.

The PTC elements 43 are continuously arranged at a predetermined gap in a circumference direction of the heat releasing plate 41 between the heat releasing plates 41. The reason why the PTC elements 43 are separately disposed in a circumference direction thereof between the heat releasing plate 41 is to increase a heat transfer area of diesel fuel of the heat releasing plate 41.

Further, the PTC elements 43 are connected to connection terminals 45a for applying an electrical signal of power and a signal system. Such a connection terminal 45a penetrates the upper cover 13 in a state that it is connected to the PTC elements 43, and is installed to be connected as an electrical signal system to a connector 47 that is provided at an upper surface of the upper cover 13.

As shown in FIG. 4 and FIG. 5, a predetermined heating space 48 is formed between the head portion 21 of the body 20 and the heat releasing plate 41 of the heater assembly 40. As shown in FIG. 7, such a heating space 48 may be connected to a space between an inner wall surface of the housing 10 and the filter assembly 11 through a plurality of penetration holes 49 that are provided in the heat releasing plate 41.

In this case, the heating space 48 between a lower surface of the head portion 21 and the heat releasing plate 41 is connected to the fuel inflow nipple 15.

Accordingly, diesel fuel that is injected into the fuel inflow nipple 15 is injected into the heating space 48, is heated by heat that is generated in the heater assembly 40, is injected into a space between an inner wall surface of the housing 10 and the filter assembly 11 through the penetration hole 49 of the heat releasing plate 41, and is supplied to the filter assembly 11.

Alternatively, as shown in FIG. 3, FIG. 4 and FIG. 5, a reinforcing plate 50 for reinforcing rigidity of the upper cover 13 is installed at a lower surface of the upper cover 13. The reinforcing plate 50 may be a plate made of a metal material, is disposed between an upper surface of the head portion 21 of the body 20 and the upper cover 13, is coupled to an upper surface of the head portion 21, and is bonded to a lower surface of the upper cover 13 through welding.

Further, an exhaust flow channel 27 for discharging diesel fuel from which moisture and foreign substances are removed while passing through the filter assembly 11 is formed in the stem portion 22 of the body 20. The exhaust flow channel 27 may be formed as a plurality of passages that penetrate to an upper surface of the head portion 21 at the external circumferential surface side of a portion in which the moisture drain passage 24 is formed in the stem portion 22.

In the foregoing description, in the reinforcing plate 50, a connection flow channel 51 that connects the exhaust flow channel 27 of the stem portion 22 and the fuel exhaust nipple 17 is formed between the reinforcing plate 50 and a lower surface of the upper cover 13.

For this purpose, the reinforcing plate 50 forms a penetrating portion 53 that is protruded from the center in a downward direction and that is coupled to an upper surface of the head portion 21 and connected to the exhaust flow channel 27 of the stem portion 22.

Further, the reinforcing plate 50 is inwardly recessed in a downward direction and forms a groove 55 of a predetermined area that is connected to the penetrating portion 53. The groove 55 may be formed as the connection flow channel 51 that connects the exhaust flow channel 27 of the stem portion 22 and the fuel exhaust nipple 17 between the upper cover 13 and the reinforcing plate 50.

Accordingly, diesel fuel from which moisture and foreign substances are removed while passing through the filter assembly 11 at the inside of the housing 10 is injected through the exhaust flow channel 27 of the stem portion 22, is injected into the connection flow channel 51 between the reinforcing plate 50 and a lower surface of the upper cover 13, is injected into the fuel exhaust nipple 17 through the connection flow channel 51, and is discharged to the outside.

Alternatively, as shown in FIG. 5, the heater assembly 40 according to various embodiments of the present invention may be selectively operated according to a detection signal of a fuel temperature sensor 91 that is previously mounted in an engine body 3.

In order words, the PTC elements 43 receive application of power and an electrical signal system through a controller 90, and the fuel temperature sensor 91 detects a temperature of fuel and outputs a detection signal thereof to the controller 90.

The controller 90 receives a detection signal from the fuel temperature sensor 91 and compares the detection signal with a reference temperature range of predetermined fuel, and if the temperature of the fuel is less than a reference temperature range, the controller 90 may apply power and the electrical operation signal to the PTC elements 43.

As shown in FIG. 3, in various embodiments of the present invention, the moisture sensor 60 is separated from diesel fuel through the filter assembly 11 to detect a water level of moisture that is stored at a lower portion of the inside of the housing 10.

The moisture sensor 60 is installed in the moisture drain passage 24 of the stem portion 22 in the body 20. Such a moisture sensor 60 includes a pair of moisture detection pins 61 that are insert-injected to the stem portion 22 and that are disposed at the moisture drain passage 24 of the stem portion 22.

Here, the moisture detection pin 61 detects, for example, a water level of moisture that is stored at a lower portion of the inside of the housing 10 through electrical resistance, and is electrically connected to a moisture detection circuit 63 that is provided at an upper surface of the upper cover 13.

The moisture detection circuit 63 may include a circuit board 65 that applies a detection source such as electrical resistance to the moisture detection pin 61 and that outputs a detection signal that is detected through the moisture detection pin 61 as a detection source to the controller 90.

Such a circuit board 65 is connected to another connection terminal 67a separately different from the connection terminal 45a of the PTC elements 43, and the connection terminal 67a thereof is connected as an electrical signal system to the connector 47 on the upper cover 13.

Referring to FIG. 3 to FIG. 5, in various embodiments of the present invention, the moisture exhaust portion 80 discharges moisture that is injected into the moisture drain passage 24 of the body 20 in a state that it is separated from the diesel fuel through the filter assembly 11 to be stored at a lower portion of the inside of the housing 10.

The moisture exhaust portion 80 is provided in an upper end portion of the body 20, i.e., the upper surface side of the head portion 21. Specifically, the moisture exhaust portion 80 includes a moisture exhaust nipple 81 that is installed to be connected to the moisture drain passage 24 of the stem portion 22, and a drain plug 83 that is installed in the moisture exhaust nipple 81.

The moisture exhaust nipple 81 penetrates the upper cover 13 and is coupled to the moisture drain passage 24 of the stem portion 22. The drain plug 83 is screw-coupled to the moisture exhaust nipple 81, closes the moisture drain passage 24, and discharges moisture that is stored at a lower portion of the inside of the housing 10 to the outside through the moisture drain passage 24.

Here, the drain plug 83 includes a plug body 85 that is screw-coupled to the moisture exhaust nipple 81 and that selectively opens and closes the moisture drain passage 24 of the stem portion 22. In such a plug body 85, a screw thread 87 is formed in a portion of an outer circumferential surface thereof, and a drain hole 89 that is connected from the remaining outer circumferential surface to an upper surface is formed.

That is, when the plug body 85 is screw-coupled to the moisture exhaust nipple 81 with a clamping method, the drain plug 83 closes the moisture drain passage 24 of the stem portion 22, and when the plug body 85 releases clamping to the moisture exhaust nipple 81, the moisture drain passage 24 is opened to the outside.

Therefore, in this way, when a clamping force of the plug body 85 to the moisture exhaust nipple 81 is released, moisture that is stored at a lower portion of the inside of the housing 10 is discharged from the moisture drain passage 24 to the outside through the drain hole 89 of the plug body 85.

Further, a water level of moisture that is injected from a lower portion of the inside of the housing 10 into the moisture drain passage 24 is detected through the moisture sensor 60, and when a detection signal thereof is output to the controller 90, a worker determines a water level of moisture, and in a state in which a clamping force of the plug body 85 to the moisture exhaust nipple 81 is released, water drainage work may be performed in an upper portion of the housing 10 through the drain hole 89 of the plug body 85.

Reference numeral 99 that is not shown in the drawing represents a sealing member that is installed between the body 20 and the reinforcing plate 50, between the fuel inflow nipple 15 and the body 20, and between the filter assembly 11 and the body 20 and that seals a gap therebetween. The sealing member 99 may include, for example, an O-ring of a rubber material.

Therefore, the diesel engine fuel filter 100 according to various embodiments of the present invention having the foregoing configuration eliminates an existing protector from the housing 10, forms the housing 10 having a larger thickness t by 0.4 t or more than an existing housing, and the housing 10 and the mounting bracket 18 are indentation-engaged through an indentation pin 19 and thus collision stability and collision performance according to a vehicle collision can be improved.

Further, in various embodiments of the present invention, because the reinforcing plate 50 that is coupled to an upper surface of the head portion 21 between the upper cover 13 and the body 20 and that is bonded to a lower surface of the upper cover 13 with a welding method is included, collision robustness, collision stability, and collision performance according to a vehicle collision can be further improved.

Further, because the diesel engine fuel filter 100 according to various embodiments of the present invention integrally forms the heater assembly 40, the moisture sensor 60, and the moisture exhaust portion 80 as a single module in the body 20, the entire structure can be simplified, the diesel engine fuel filter 100 can be implemented in a compact size, and by minimizing a protruded portion at the upper cover 13 side, when a vehicle collides, structural robustness can be maintained.

Because the diesel engine fuel filter 100 according to various embodiments of the present invention integrally forms the heater assembly 40, the moisture sensor 60, and the moisture exhaust portion 80 in the body 20, assembly workability of the entire apparatus 100 can be improved, and water drainage work can be performed at the upper cover 13 side through the moisture exhaust portion 80 and thus maintainability can be improved.

Further, the diesel engine fuel filter 100 according to various embodiments of the present invention controls operation of the heater assembly 40 using a fuel temperature sensor 91 that is previously mounted in the engine body 3 through the controller 90 such as an engine ECU, and thus an existing thermo switch may be eliminated.

Therefore, in various embodiments of the present invention, because an existing thermo switch can be eliminated, a structure of the entire apparatus 100 can be simplified, layout of the vehicle body 1 can be easily set, and by reducing the number of assembly components, an assembly inferiority rate, production cost, and weight can be reduced.

Further, unlike the conventional art of a method of exchanging a cartridge including a filter and a housing as a regular exchange component, the diesel engine fuel filter 100 according to various embodiments of the present invention can remove the upper cover 13 from the housing 10 and exchange only the filter assembly 11 within the housing 10 and thus can minimize environmental pollution according to destruction of a cartridge.

Hereinafter, operation of the diesel engine fuel filter 100 according to various embodiments of the present invention having the foregoing configuration will be described in detail with reference to the accompanying drawings.

Figure 8:
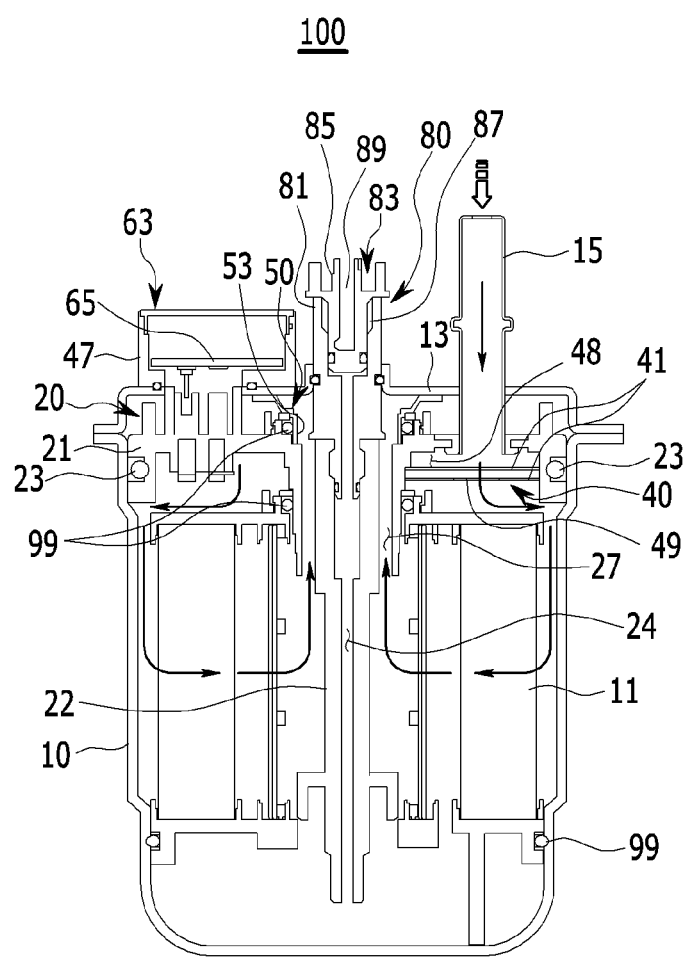
FIG. 8 and FIG. 9 are cross-sectional views illustrating operation of the exemplary fuel filter for the diesel engine according to the present invention.
Figure 9:
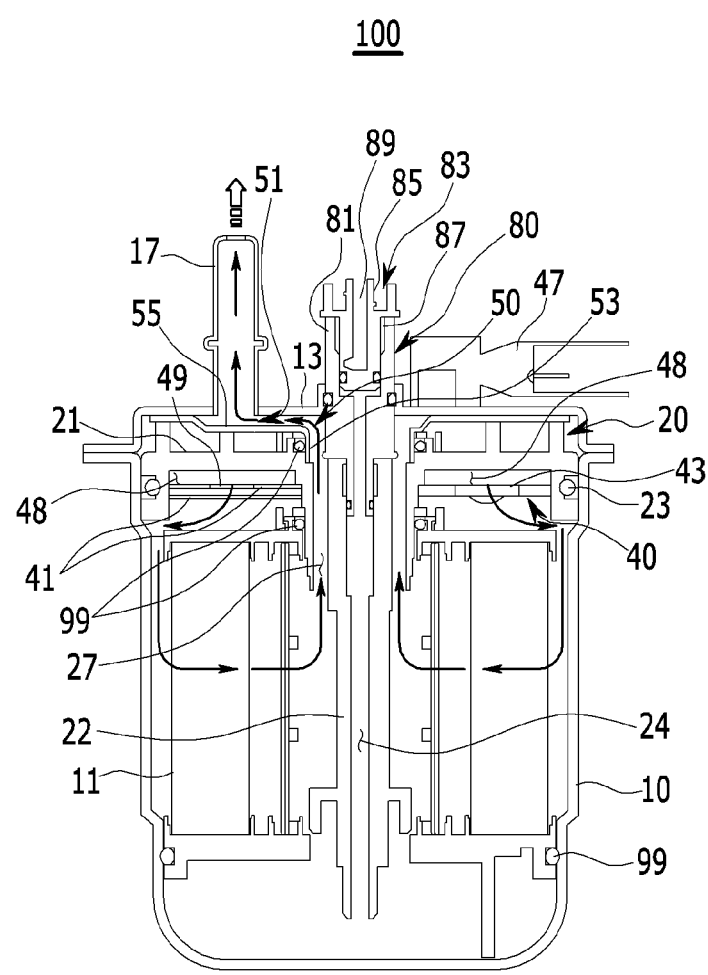

FIGS. 8 and 9 are cross-sectional views illustrating operation of a fuel filter for a diesel engine according to various embodiments of the present invention.

First, as shown in the foregoing drawings and FIGS. 8 and 9, in various embodiments of the present invention, diesel fuel that is supplied from a fuel tank (not shown) is injected into the inside of the housing 10 through the fuel inflow nipple 15 of the upper cover 13.

Accordingly, diesel fuel that is injected into the fuel inflow nipple 15 may be injected into the heating space 48 between the head portion 21 of the body 20 and the heat releasing plate 41, may be injected to space between an inner wall surface of the housing 10 and the filter assembly 11 through the penetration hole 49 of the heat releasing plate 41, and may be supplied to the filter assembly 11.

In such a process, in various embodiments of the present invention, the temperature of the diesel fuel is detected through the fuel temperature sensor 91 that is previously mounted in the engine body 3, and a detection signal thereof is output to the controller 90.

The controller 90 receives the detection signal from the fuel temperature sensor 91, compares the detection signal with a predetermined reference temperature range of diesel fuel, and if the temperature of diesel fuel is less than the reference temperature range, the controller 90 applies power and an electrical operation signal to the PTC elements 43 of the heater assembly 40.

Accordingly, the PTC elements 43 receive application of power through connection terminals 45a that are connected to the connector 47 to generate heat. Such heat is released through the heat releasing plate 41 and heats the diesel fuel that is injected into the heating space 48 to a predetermined temperature.

In various embodiments of the present invention, because the PTC elements 43 are separately disposed in a circumference direction of the heat releasing plates 41 between the heat releasing plates 41, heat transfer area of the diesel fuel of the heat releasing plate 41 can be increased.

As described above, diesel fuel that is injected into the space between the inner wall surface of the housing 10 and the filter assembly 11 and that is supplied to the filter assembly 11 passes through the filter assembly 11.

In such a process, foreign substances that are contained in the diesel fuel are filtered by the filter assembly 11, and the diesel fuel from which the foreign substances are removed is discharged through the fuel exhaust nipple 17 of the upper cover 13 and is supplied to the engine side.

Diesel fuel from which foreign substances are removed while passing through the filter assembly 11 at the inside of the housing 10 is injected through the exhaust flow channel 27 of the stem portion 22, is injected into the connection flow channel 51 between the reinforcing plate 50 and a lower surface of the upper cover 13, is injected into the fuel exhaust nipple 17 through the connection flow channel 51, and is discharged to the engine side.

As described above, in various embodiments of the present invention, in a low temperature condition such as a winter season, because diesel fuel may be heated through the heater assembly 40 and be supplied to the filter assembly 11 in a state in which the diesel fuel is not coagulated in a low temperature condition, the diesel fuel may be supplied to the engine.

Alternatively, in the foregoing process, in various embodiments of the present invention, moisture that is included in the diesel fuel is separated from the diesel fuel through the filter assembly 11 due to a specific gravity difference and is stored at a lower portion of the inside of the housing 10.

In this way, moisture that is stored at a lower portion of the inside of the housing 10 is injected into the moisture drain passage 24 of the stem portion 22 of the body 20. Therefore, the moisture detection pin 61 of the moisture sensor 60 detects a water level of moisture that is injected into the moisture drain passage 24 of the stem portion 22 and outputs a detection signal thereof to the controller 90 through the circuit board 65 of the moisture detection circuit 63 and the connection terminal 67a.

Therefore, in various embodiments of the present invention, by determining a water level of moisture through the controller 90, when releasing clamping of the plug body 85 to the moisture exhaust nipple 81, moisture that is stored in a lower portion of the inside of the housing 10 may be discharged from the moisture drain passage 24 to the outside through the drain hole 89 of the plug body 85.

That is, in an exemplary embodiment of the present invention, at the upper cover 13 side, which is an upper portion of the housing 10, water drainage work of the inside of the housing 10 may be performed through the moisture exhaust nipple 81.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel filter for a diesel engine, the fuel filter comprising:
    an upper cover forming inflow and outflow passages of diesel fuel;
    a housing integrally mounted in a vehicle body through a mounting bracket, coupled to the upper cover, and housing a filter assembly;
    a body forming a moisture drain passage that penetrates a central portion of the filter assembly, disposed between the upper cover and the filter assembly, and connected to an inner lower portion of the housing;
    a heater assembly installed at an inside of an upper end portion of the body;
    a moisture sensor installed in the moisture drain passage of the body and configured to detect a water level of moisture that is separated from diesel fuel; and
    a moisture exhaust portion that is provided in an upper end portion of the body in order to discharge moisture that is injected into the moisture drain passage and that penetrates the upper cover,
    wherein the body comprises:
        a head portion located between the upper cover and the filter assembly and fixed to an inner wall surface of the housing; and
        a stem portion integrally connected to the head portion, penetrating the central portion of the filter assembly, and forming the moisture drain passage,
    wherein an outer circumferential portion of a reinforcing plate that reinforces rigidity of the upper cover is bonded to a lower surface of the upper cover to form a connecting flow channel positioned between the reinforcing plate and the lower surface of the upper cover,
    wherein a fuel exhaust nipple to form the outflow passage for discharging the diesel fuel from which moisture and a foreign substance are removed while passing through the filter assembly is installed in the upper cover, wherein an exhaust flow channel for discharging the diesel fuel from which the moisture and the foreign substance are removed while passing through the filter assembly is formed between the stem portion and the reinforcing plate, and wherein the connection flow channel connects the exhaust flow channel and the fuel exhaust nipple.

2. The fuel filter of claim 1, wherein the body has a single module form and integrally forms the upper cover, the heater assembly, the moisture sensor, and the moisture exhaust portion.

3. The fuel filter of claim 1, wherein the heater assembly comprises:
a pair of heat releasing plates installed at a predetermined gap from a lower surface of the head portion; and
a plurality of Positive Temperature Coefficient (PTC) heaters fixedly installed between the pair of heat releasing plates.

4. The fuel filter of claim 3,
wherein a predetermined heating space is formed between a lower surface of the head portion and the heat releasing plate, and
wherein the heating space is connected to a space between an inner wall surface of the housing and the filter assembly through at least one penetration hole provided in the heat releasing plate.

5. The fuel filter of claim 4,
wherein a fuel inflow nipple connected to the heating space and configured to inject diesel fuel into the filter assembly to form the inflow passage, is installed in the upper cover, and
wherein the fuel exhaust nipple configured to discharge diesel fuel from which moisture and a foreign substance are removed while passing through the filter assembly, is installed in the upper cover.

6. The fuel filter of claim 1, wherein the reinforcing plate comprises a penetrating portion protruded from a center thereof in a downward direction, coupled to the upper surface of the head portion, and connected to the exhaust flow channel of the stem portion.

7. The fuel filter of claim 6,
wherein the reinforcing plate forms a groove of a predetermined area that is inwardly recessed in a downward direction and that is connected to the penetrating portion, and
wherein the groove is formed as the connection flow channel that connects the exhaust flow channel and the fuel exhaust nipple between the upper cover and the reinforcing plate.

8. The fuel filter of claim 1, wherein the moisture sensor comprises a pair of moisture detection pins that are insert-injected to the stem portion and that are disposed at the moisture drain passage.

9. The fuel filter of claim 8, wherein a moisture detection circuit that is electrically connected to the moisture detection pin is installed at an upper surface of the upper cover.

10. The fuel filter of claim 1, wherein the moisture exhaust portion comprises:
a moisture exhaust nipple that penetrates the upper cover and that is connected to the moisture drain passage of the stem portion; and
a moisture drain plug installed in the moisture exhaust nipple.

11. The fuel filter of claim 10, wherein the drain plug comprises a plug body that is screw-coupled to the moisture exhaust nipple and that selectively opens and closes the moisture drain passage, and a screw thread, formed at a portion of an outer circumferential surface of the plug body, and a drain hole, connected from a remaining outer circumferential surface of the plug body to an upper surface of the plug body, are formed at the plug body.

* * * * *